United States Patent
Lee

(10) Patent No.: US 6,675,318 B1
(45) Date of Patent: Jan. 6, 2004

(54) TWO-DIMENSIONAL STORAGE ARRAY WITH PROMPT PARITY IN ONE DIMENSION AND DELAYED PARITY IN A SECOND DIMENSION

(75) Inventor: Whay S. Lee, Newark, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 716 days.

(21) Appl. No.: 09/624,851

(22) Filed: Jul. 25, 2000

(51) Int. Cl.⁷ ............................................... G06F 11/00
(52) U.S. Cl. ........................................... 714/6; 714/770
(58) Field of Search ....................... 714/6, 770; 711/114

(56) References Cited

U.S. PATENT DOCUMENTS

| | | | | |
|---|---|---|---|---|
| 5,412,661 A | * | 5/1995 | Hao et al. | 714/6 |
| 5,574,882 A | * | 11/1996 | Menon et al. | 711/114 |
| 6,070,249 A | * | 5/2000 | Lee | 714/6 |
| 6,101,615 A | * | 8/2000 | Lyons | 714/6 |
| 6,158,017 A | * | 12/2000 | Han et al. | 714/6 |
| 6,247,157 B1 | * | 6/2001 | Edirisooriya | 714/767 |
| 6,571,351 B1 | * | 5/2003 | Mitaru et al. | 714/6 |

OTHER PUBLICATIONS

Lee, Min Young "Double Parity Sparing for Improvement of Performance and Reliablity in Disk Arrays" 1996, 1087–4089/96.*

D.A. Patterson, G.A. Gibson, R.H. Katz, "A Case for Redundant Arrays of Inexpensive Disks (RAID)," Proceedings of the International Conference on Management of Data (SIGMOD), Jun. 1988, pp. 109–116.

Chen, et al., "RAID: High–Performance, Reliable Secondary Storage," ACM Computing Surveys, Jun. 1994, pp. 1–65.

Savage and Wilkes, "AFRAID–A Frequently Redundant Array of Independent Disks," USENIX Technical Conference, Jan. 22–26, 1996, pp. 27–39.

\* cited by examiner

*Primary Examiner*—Robert Beausoliel
*Assistant Examiner*—Bryce P. Bonzo
(74) *Attorney, Agent, or Firm*—Robert C. Kowert; Meyertons, Hood, Kivlin, Kowert & Goetzel, P.C.

(57) ABSTRACT

A storage system is described including a two dimensional array of disk drives having multiple logical rows of drives and multiple logical columns of drives, and at least one drive array controller configured to store data in stripes (e.g., across the logical rows). A given drive array controller calculates and stores: row error correction data for each stripe of data across each one of the logical rows on one of the drives for each row, and column error correction data for column data grouped (i.e., striped) across each one of the logical columns on one of the drives for each column. The drive array controller may respond to a write transaction involving a particular row data stripe by calculating and storing row error correction data for the row data stripe before completing the write transaction. In this case, the drive array controller delays calculating and storing the column error correction data for each column data stripe modified by the write transaction until after completion of the write transaction. Methods for storing data within the disk drive array, and for repairing the disk drive array following failure of one or more of the disk drives, are also described.

20 Claims, 8 Drawing Sheets

TWO-DIMENSIONAL STORAGE ARRAY WITH PROMPT PARITY IN ONE DIMENSION AND DELAYED PARITY IN A SECOND DIMENSION

BACKGROUND OF THE INVENTION

1. Field of the Invention

This invention relates to data storage systems, and more particularly to data storage systems including multiple disk drives.

2. Description of the Related Art

Data storage systems including multiple disk drives are well known. In general, the reliability of a system is dependent upon the failure rates of hardware system components. As each component has a limited operational lifetime, the reliability of a system requiring all components to remain operational necessarily decreases as the number of components increases. For example, the more disk drives a data storage system includes, the more likely it is that one of the disk drives will fail. When the data storage system requires all of the disk drives to remain operational, the reliability of the data storage system decreases as the number of disk drives increase. Typical redundant array of inexpensive/independent disks (RAID) data storage systems store redundant data to allow the systems to remain operational despite a disk drive failure. As typical RAID data storage systems do not require all of the disk drives to remain operational, system reliabilities are increased.

FIG. 1 is a diagram of one embodiment of a conventional RAID data storage system 10 including a disk array controller 12 coupled to five disk drives 14. In the embodiment of FIG. 1, disk array controller 12 implements a level 4 RAID including data striping and a dedicated parity disk drive storing parity information. Disk array controller 12 divides incoming data to be stored within disk drives 14 into separate data blocks, groups blocks bound for separate disk drives by "stripe," calculates an updated parity block for each updated stripe, and writes the updated data and parity blocks to disk drives 14 in stripe-by-stripe fashion. In FIG. 1, data blocks are denoted using the letter D and parity blocks are denoted using the letter P. Disk array controller 12 calculates a parity block for updated stripes as an exclusive-OR of the data within the four data blocks of the stripes, and writes the updated data blocks and the parity block to disk drives 14 in stripe-by-stripe fashion. For example, where write data includes data bound for data block D1 in FIG. 1, disk array controller 12 forms an updated data block D1, retrieves the contents of data blocks D2–D4, calculates an updated parity block P(D1–D4) using updated data block D1 and the contents of data blocks D2–D4, and writes updated data block D1 and updated parity block P(D1–D4) to disk drives 14. Parity may also be calculated by retrieving the old versions of D1 and P(D1–D4), computing the difference between the old and new versions of D1, recalculating P(D1–D4) from that difference, and writing the new versions of D1 and P(D1–D4).

FIG. 2 is a diagram of a second embodiment of RAID storage system 10 wherein disk array controller 12 implements level 5 RAID including data striping and distributed parity information. As in the level 4 RAID embodiment of FIG. 1, disk array controller 12 divides incoming data into separate data blocks, groups the blocks bound for separate disk drives by stripe, calculates an updated parity block for each updated stripe, and writes the updated data and parity blocks to disk drives 14 in stripe-by-stripe fashion. However, instead of having a single dedicated parity drive as in FIG. 1, storage system 10 of FIG. 2 disperses the parity blocks among the five disk drives 14. This prevents the dedicated parity drive from becoming a performance bottleneck as typically occurs in the level 4 RAID embodiment of FIG. 1.

Important storage system parameters include performance, reliability, and data availability. Data striping is a software technique which improves the performance of a storage system with multiple disk drives by allowing simultaneous access to the disk drives. In addition to configuring a data storage system such that the system does not require all of multiple disk drives to remain operational, adding redundant spare hardware components may improve system reliability. For example, adding a spare disk drive to be substituted for a failed disk drive during system operation may increase system reliability.

Data availability is dependent upon system reliability, and is often increased by adding data redundancy. For example, the parity information generated in RAID levels 4 and 5 for each stripe may be used to recreate any one of the data blocks of a stripe should a disk drive storing a data block of the stripe fail. However, the generation and/or storage of parity information typically has a negative impact on system performance. As described above, the dedicated parity disk drive is typically a performance bottleneck in level 4 RAID. Dispersing the parity blocks in level 5 RAID eliminates the negative impact of the single parity disk drive on system performance. However, even in level 5 RAID, additional read accesses are usually required to calculate parity every time one or more data blocks are modified. Also, conventional level 4 and level 5 RAID systems cannot recover from multiple disk drive failures in the same parity row.

The RAID techniques described above allow data storage system 10 to continue to operate despite the failure of a single disk drive. However, the likelihood of multiple disk drive failures also increases with the number of disk drives in the data storage system. It would thus be beneficial to have a storage system with multiple disk drives which allows continued system operation despite multiple disk drive failures and achieves a satisfactory balance between performance, reliability, and data availability.

SUMMARY OF THE INVENTION

A storage system is described including a two dimensional array of disk drives having multiple logical rows of drives and multiple logical columns of drives, and at least one drive array controller configured to store data in stripes (e.g., across the logical rows). A given drive array controller calculates and stores: row error correction data for each stripe of data across each one of the logical rows on one of the drives for each row, and column error correction data for column data grouped (i.e., striped) across each one of the logical columns on one of the drives for each column. The drive array controller may respond to a write transaction (i.e., a write operation) involving a particular row data stripe by calculating and storing row error correction data for the row data stripe before completing the write transaction. In this case, the drive array controller delays calculating and storing the column error correction data for each column data stripe modified by the write transaction until after completion of the write transaction.

The drive array controller may update column error correction data during idle times. Alternately, the drive array controller may update column error correction data periodically. The drive array controller may only update column error correction data for column data stripes modified since the corresponding column error correction data was last updated. The drive array controller may maintain a table of column data stripes modified by a write transaction since the column error correction data was last updated. The row error correction data may include parity data for each row data stripe. Similarly, the column error correction data may include parity data for each column data stripe.

The drive array controller may be configured to recover a failed disk drive. If a given logical row of drives includes only a single failed disk drive, the drive array controller may use row error correction data to recover the failed disk drive. On the other hand, if the logical row of drives includes multiple failed disk drives, and no column stripes have been modified for the logical column including the failed disk drive since the last column error correction data update, the drive array controller may use column error correction data to recover the failed disk drive.

One embodiment of a data storage system includes multiple disk drives logically arranged to form a two-dimensional disk drive array, and a disk array controller coupled to each of the disk drives. The disk drive array has a m+1 rows and n+1 columns where $m \geq 2$ and $n \geq 2$. Each disk drive includes q data storage regions where $q \geq 1$. Each row of the disk drive array includes q row stripes, wherein each row stripe includes a different one of the q data storage regions of each of the n+1 disk drives in the same row. Similarly, each column of the disk drive array includes q column stripes, wherein each column stripe includes a different one of the q data storage regions of each of the m+1 disk drives in the same column.

The disk array controller may be configured to group data to be stored in a given row stripe during a write operation, to calculate a row parity block for the given row stripe, and to calculate a column parity block for each column stripe modified during the write operation. In this case, the disk array controller is configured to either: (i) calculate the row parity block for the given row stripe before completing the write operation, and delay the column parity block calculations until after the completion of the write operation, or (ii) calculate the column parity blocks before completing the write operation, and delay the row parity block calculation until after the completion of the write operation.

The m+1 rows include a first m rows and a last row, and the n+1 columns include a first n columns and a last column. In one embodiment, the first m rows and the first n columns may include data disk drives for storing data. The last row includes n parity disk drives for storing column parity information, and the last column includes m parity disk drives for storing row parity information (e.g., as in level 3 or level 4 RAID). In this embodiment, a disk drive location in the last row and the last column may be empty. In other embodiments, parity information may be dispersed among the disk drives of the disk drive array (e.g., as in level 5 RAID), and an operational disk drive may be located in the disk drive location in the last row and the last column.

One of the data storage regions in each row stripe may be used to store a row parity block, and the remaining n data storage regions of each row stripe may be used to store data blocks. The row parity block may be dependent upon the n data blocks of the row stripe. For example, the disk array controller may calculate the row parity block for a given row stripe as an exclusive-OR of the contents of n data blocks of the row stripe.

Similarly, one of the data storage regions in each column stripe may be used to store a column parity block, and the remaining m data storage regions of each column stripe may be used to store data blocks. The column parity block may be dependent upon the m data blocks of the column stripe. For example, the disk array controller may calculate the column parity block for a given column stripe as an exclusive-OR of the contents of m data blocks of the column stripe.

The disk storage system may include a memory for storing information used to track the parity block calculations delayed by the disk array controller. The memory may be a non-volatile memory, and may reside within the disk array controller.

One method for storing data within the disk drive array described above includes grouping data to be stored in a given row stripe during a write operation. A row parity block is calculated for the given row stripe. The data and the associated row parity block are written to the corresponding disk drives of the array, thereby completing the write operation. Following completion of the write operation, a column parity block is calculated for each column stripe modified during the write operation. The column parity blocks are written to the disk drives storing parity blocks for the modified column stripes.

Another method for storing data within the disk drive array described above includes grouping data to be stored in a given row stripe during a write operation. A column parity block is calculated for each column stripe modified during the write operation. The data and the column parity blocks are written to the corresponding disk drives of the array, thereby completing the write operation. Following completion of the write operation, a row parity block is calculated for the given row stripe. The row parity block is written to the disk drive storing the row parity block for the given row stripe.

One method for repairing the above described disk drive array following failure of one or more of the disk drives includes selecting a failed disk drive. A determination is then made as to whether or not data stored in the selected failed disk drive is recoverable using either: (i) data stored in other disk drives in the row in which the selected failed disk drive resides, or (ii) data stored in other disk drives in the column in which the selected failed disk drive resides. The following steps are performed if the data stored in the selected failed disk drive is recoverable: (i) recovering the data stored in the selected failed disk drive, and (ii) writing the recovered data to a spare (or repaired or replacement) disk drive, and (iii) replacing the selected failed disk drive in the disk drive array with the spare (or repaired or replacement) disk drive. The above steps may be repeated until all failed disk drives have been repaired or replaced by new ones.

When the selected failed disk drive resides in a given row of the disk drive array, the data stored in the selected failed disk drive may be recoverable using data stored in other disk drives in the given row unless: (i) any of the other disk drives in the given row is not operational, or (ii) row parity data stored in any of the other disk drives in the given row is not current. Similarly, when the selected failed disk drive resides in a given column of the disk drive array, the data stored in the selected failed disk drive may be recoverable using data stored in other disk drives in the given column unless: (i) any of the other disk drives in the given column is not operational, or (ii) column parity data stored in any of the other disk drives in the given column is not current.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Figure 1:
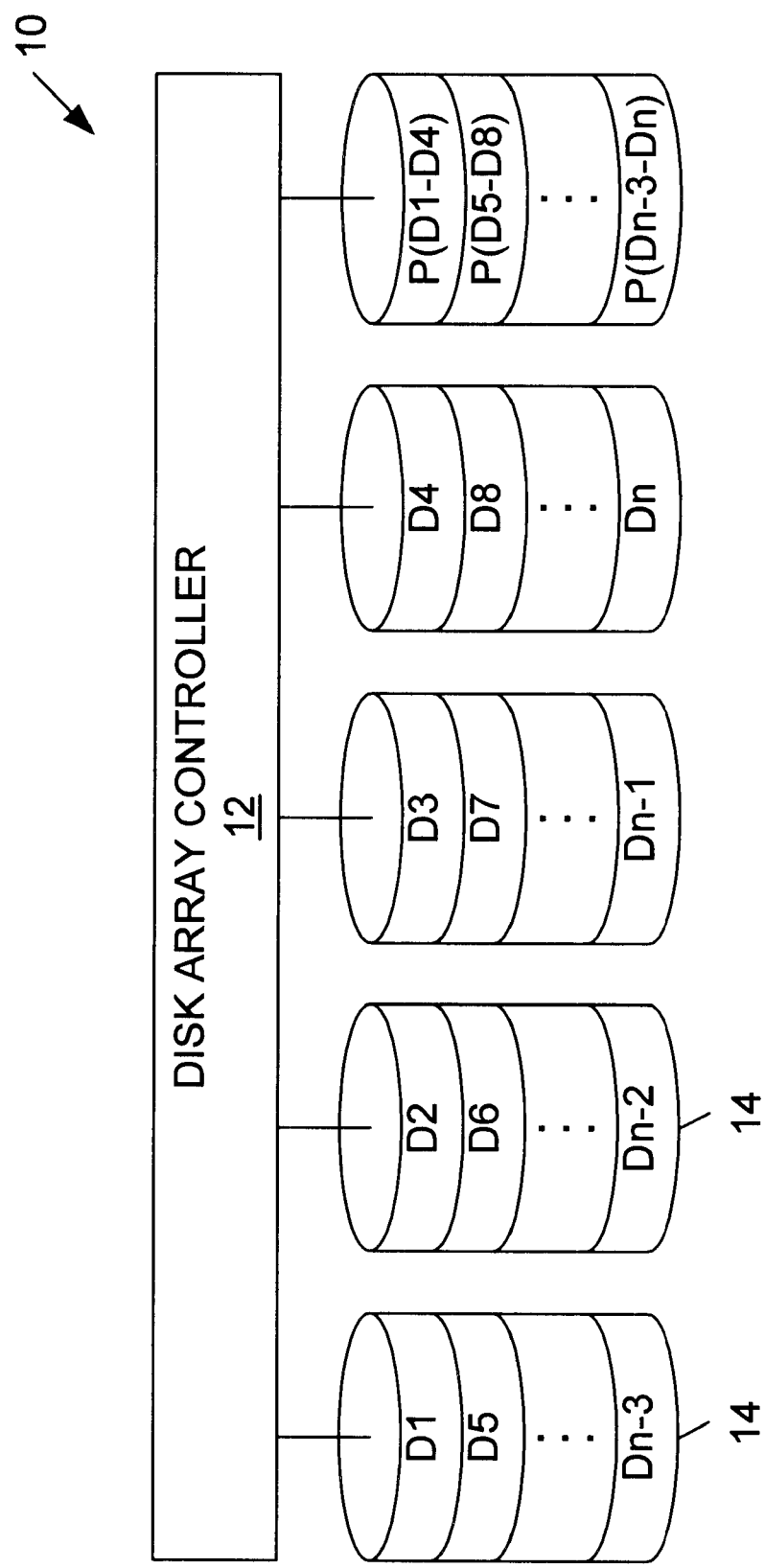
FIG. 1 is a diagram of one embodiment of a conventional RAID data storage system including a disk array controller coupled to five disk drives, wherein the disk array controller implements a level 4 RAID including data striping and a dedicated parity disk drive storing parity information.
Figure 2:
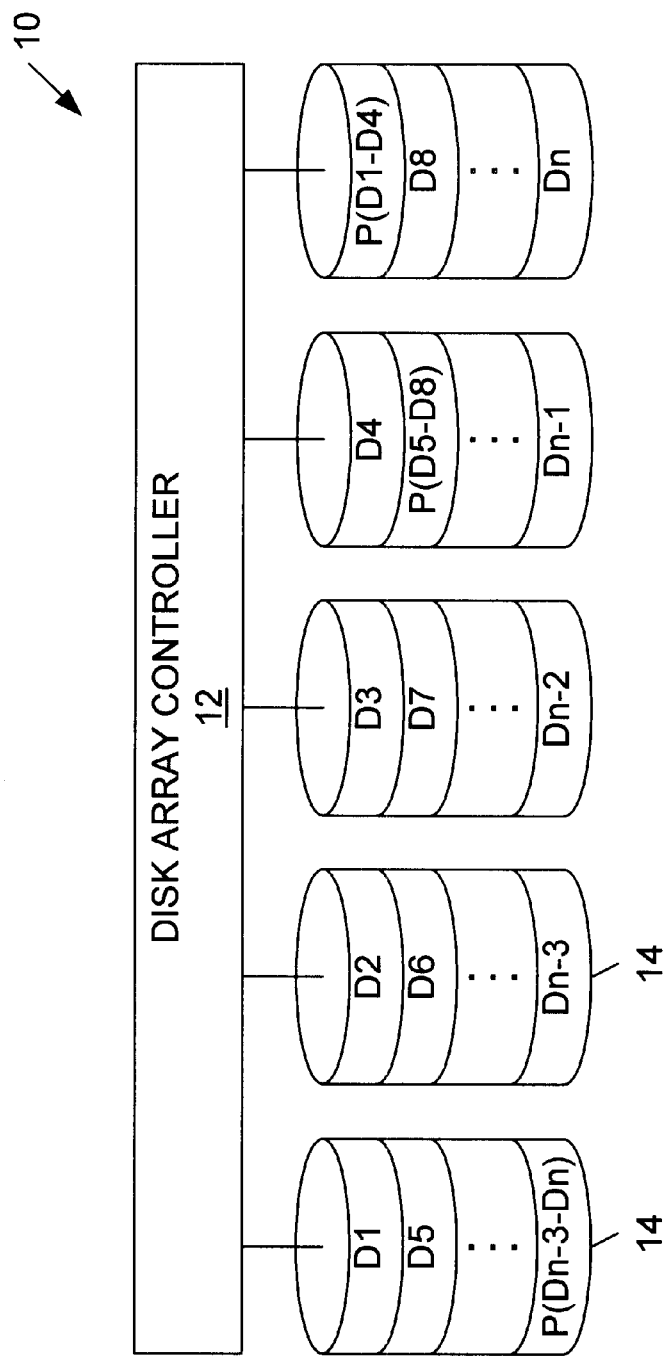
FIG. 2 is a diagram of a second embodiment of the RAID storage system of FIG. 1 wherein the disk array controller implements level 5 RAID including data striping and distributed parity information.
Figure 3:
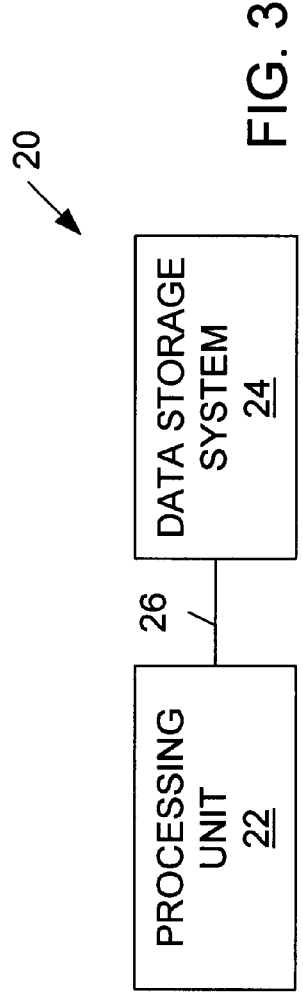
FIG. 3 is a diagram of one embodiment of a computer system including a processing unit coupled to a data storage system via a bi-directional communication link.

FIG. 3 is a diagram of one embodiment of a computer system 20 including a processing unit 22 coupled to a data storage system 24 via a bi-directional communication link 26. Communication link 26 may include a fibre channel link for example. In another embodiment, link 26 may include a bus conveying communications defined by an AT attachment (ATA) standard such as ANSI X3.221-1994, or any other ATA standard or variant thereof. Alternately, communication link 26 may convey SCSI communications, or any other communications suitable for coupling data storage system 24 to processing unit 22.

Figure 4:
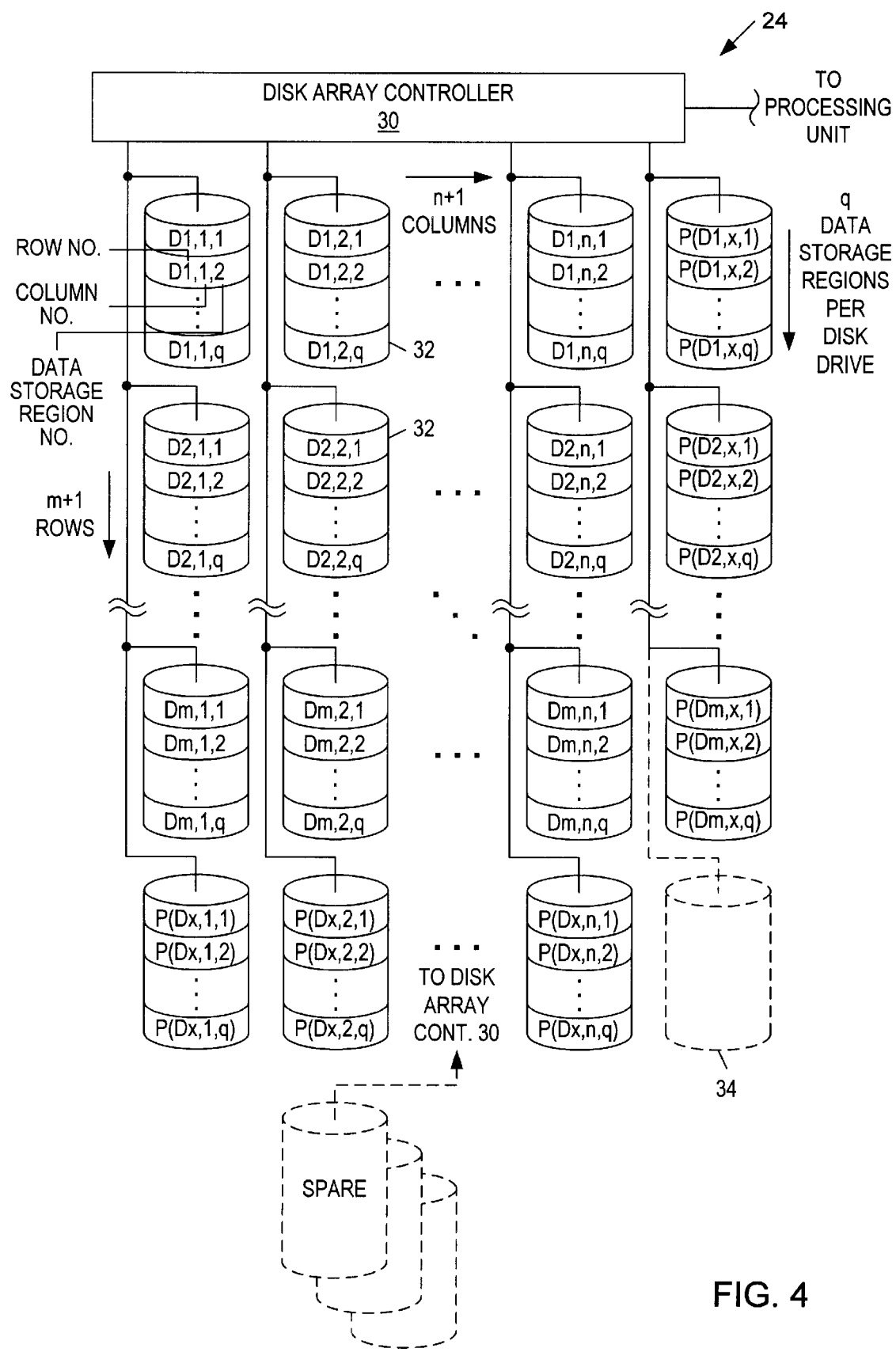
FIG. 4 is a diagram of one embodiment of the data storage system of FIG. 3, wherein the data storage system including a disk array controller coupled to multiple disk drives, and wherein the disk drives are logically arranged to form a two-dimensional disk drive array.

FIG. 4 is a diagram of one embodiment of a data storage system 24 including a disk array controller 30 coupled to multiple disk drives 32. Data storage system 24 may also include spare disk drives as shown in FIG. 4. Operational (i.e., non-spare) disk drives 32 are logically arranged to form a two-dimensional disk drive array having m+1 rows and n+1 columns, where m and n are integers greater than or equal to 2. In the embodiment of FIG. 4, m rows and n columns of the disk drive array have data disk drives for storing data. A last row includes n parity disk drives for storing column parity information, and a last column includes m disk drives for storing row parity information. A disk drive location 34 in the last row and the last column of the disk drive array may be empty. Alternately, a disk drive disk located in disk drive location 34 may store parity information for the last row or the last column. Further, a spare disk drive may be located in disk drive location 34. In other embodiments, parity information may be dispersed among the disk drives of the m+1 rows and n+1 columns, and an operational disk drive may be located in disk drive location 34.

When m and n are relatively large numbers, the probability that two or more of disk drives 32 will fail simultaneously over an extended period of time is relatively high. In order to increase data availability in the event that two or more of disk drives 32 fail simultaneously, data storage system 24 calculates and stores parity information in the two dimensions of the disk drive array (i.e., along both the rows and columns of the array). To reduce the negative impact of the parity calculations on the performance of data storage system 24, disk array controller implements a two-stage parity update scheme wherein parity information along one of the two dimensions (e.g., the rows of the array) is always updated during write operations, and parity information along the other dimension (e.g., the columns of the array) is performed in a delayed manner (e.g., periodically or during system idle times).

Disk drives 32 may support fibre channel connectivity. Alternatively, disk drives 32 may include an integrated controller according to the intelligent/integrated drive electronics (IDE) interface technology for mass storage devices. IDE disk drives may include a bi-directional communication port according to an ATA standard such as ANSI X3.221-1994, or any other ATA standard or variant thereof. Alternately, each disk drive 32 may include a bi-directional SCSI or other suitable communication port. Disk array controller 30 may be coupled to each disk drive 32 via a bus conveying ATA-defined communications. Disk array controller 30 may include redundant circuitry to increase the reliability of data storage system 24.

In FIG. 4, each disk drive 32 has q data storage regions, where $q \geq 1$. Data blocks are denoted using the letter D followed by a position trio "r, c, s" where r is the row number of the disk drive on which the data block resides, c is the column number of the disk drive on which the data block resides, and s is the number of the data storage region of the disk drive on which the data block resides. For example, the data block in FIG. 4 labeled "$D_{1,1,1}$" resides on the disk drive in row 1 and column 1 of the array, and in storage region 1 of the disk drive. Parity blocks are denoted using the letter P followed by a designation of the data blocks used to calculate, and associated with, the parity blocks. For example, the parity block labeled "$P(D_{1,X,1})$" in FIG. 4 is the parity block calculated from, and associated with, the data blocks residing on the disk drives in row 1 of the disk array, and in storage regions 1 of the disks. The parity block labeled "$P(D_{X,1,1})$ in FIG. 4 is the parity block calculated from, and associated with, the data blocks residing on the disk drives in column 1 of the disk array, and in data storage regions 1 of the disks.

In FIG. 4, each row of the disk drive array includes q row stripes, where each row stripe includes a different one of the q data storage regions of the n+1 disk drives in the same row. For example, a first of the q row stripes in a first row of the disk drive array includes the data blocks labeled "$D_{1,X,1}$," and parity block "$P(D_{1,X,1})$." Each column of the disk drive array includes q column stripes, where each column stripe includes a different one of the q data storage regions of the m+1 disk drives in the same column. For example, a first of the q column stripes in a first column of the disk drive array includes the data blocks labeled "$D_{X,1,1}$" and parity block "$P(D_{X,1,1})$."

As indicated in FIG. 4, the disk drive array may also include a number of spare disk drives. As described below, such spare disk drives may be used to replace failed disk drives of the disk drive array. In the absence of spare disk drives in the system, the failed disk drives may also be repaired or replaced manually.

Figure 5:
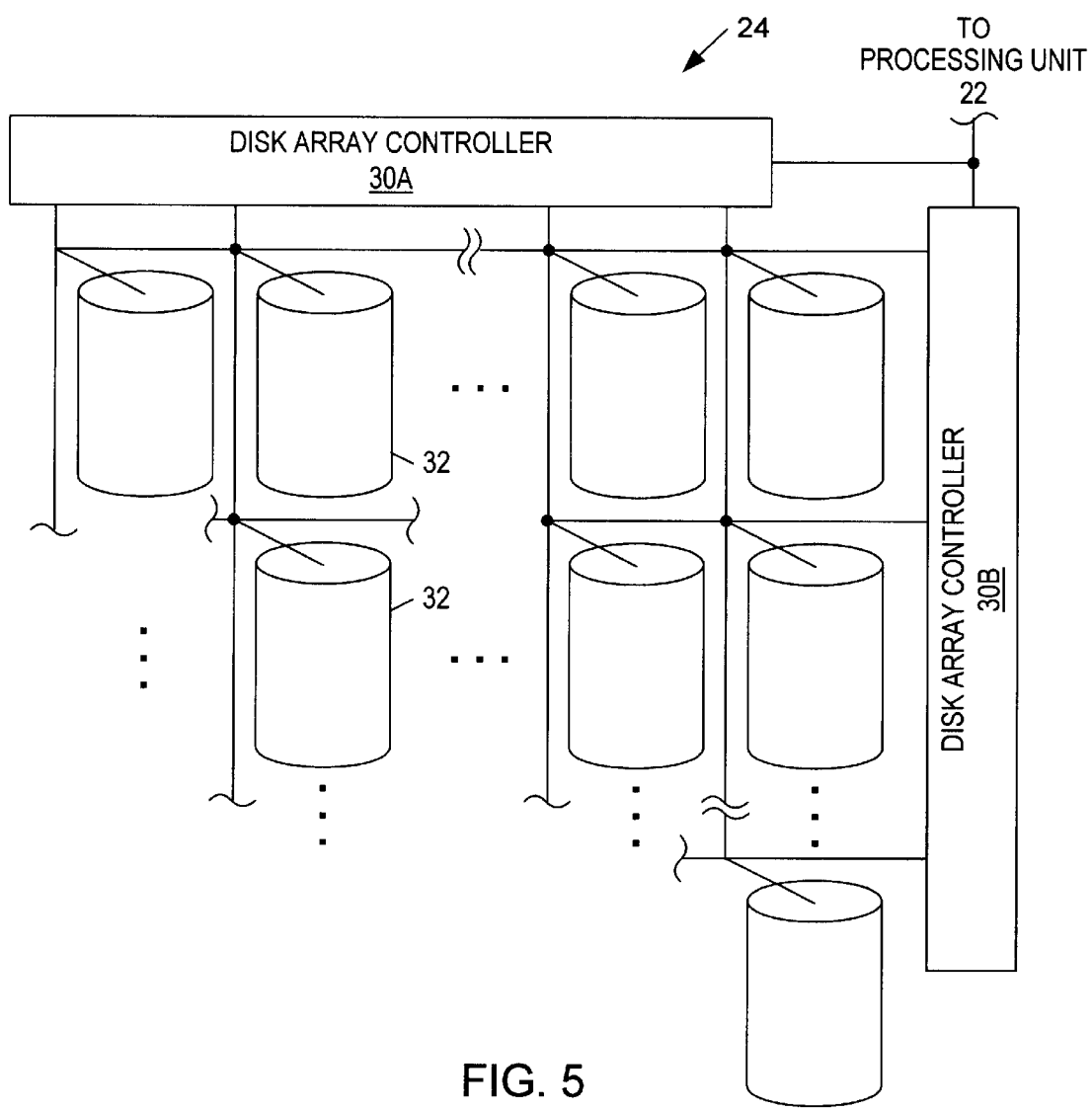
FIG. 5 is a diagram of an alternate embodiment of the data storage system of FIG. 4 including a two disk array controllers each coupled to the disk drives of the disk drive array, wherein each disk array controller is capable of controlling the disk drives independent of the other.

FIG. 5 is a diagram of an alternate embodiment of data storage system 24 including a two disk array controllers 30A–30B each coupled to disk drives 32. Each disk array controller 30 is capable of controlling disk drives 32 independent of the other. In one embodiment, only one of the disk array controllers 30 may be operating at any given time. Should the operational disk array controller 30 fail, the other disk array controller 30 may assume control of disk drives 32. For example, disk array controller 30A may include control circuitry for disk drives 32 in each column of the disk drive array, and disk array controller 30B may include control circuitry for disk drives 32 in each row of the disk drive array. In one embodiment, fibre channel disks are employed since each fibre channel disk has two independent ports that may be connected to the two independent controllers.

Disk array controller 30 may operate disk drives 32 in a row-dominant or "lazy column" parity update mode, or a column-dominant or "lazy row" parity update mode. Further, data may be written to disk drives 32 in row-major fashion (i.e., row by row), or in column-major fashion (i.e., column by column). The following methods of implementing the lazy column and lazy row parity update modes assume row-major storage of data within disk drives 32. Methods of implementing the lazy column and lazy row parity update modes with column-major data storage can easily be derived from the following method descriptions.

Figure 6:
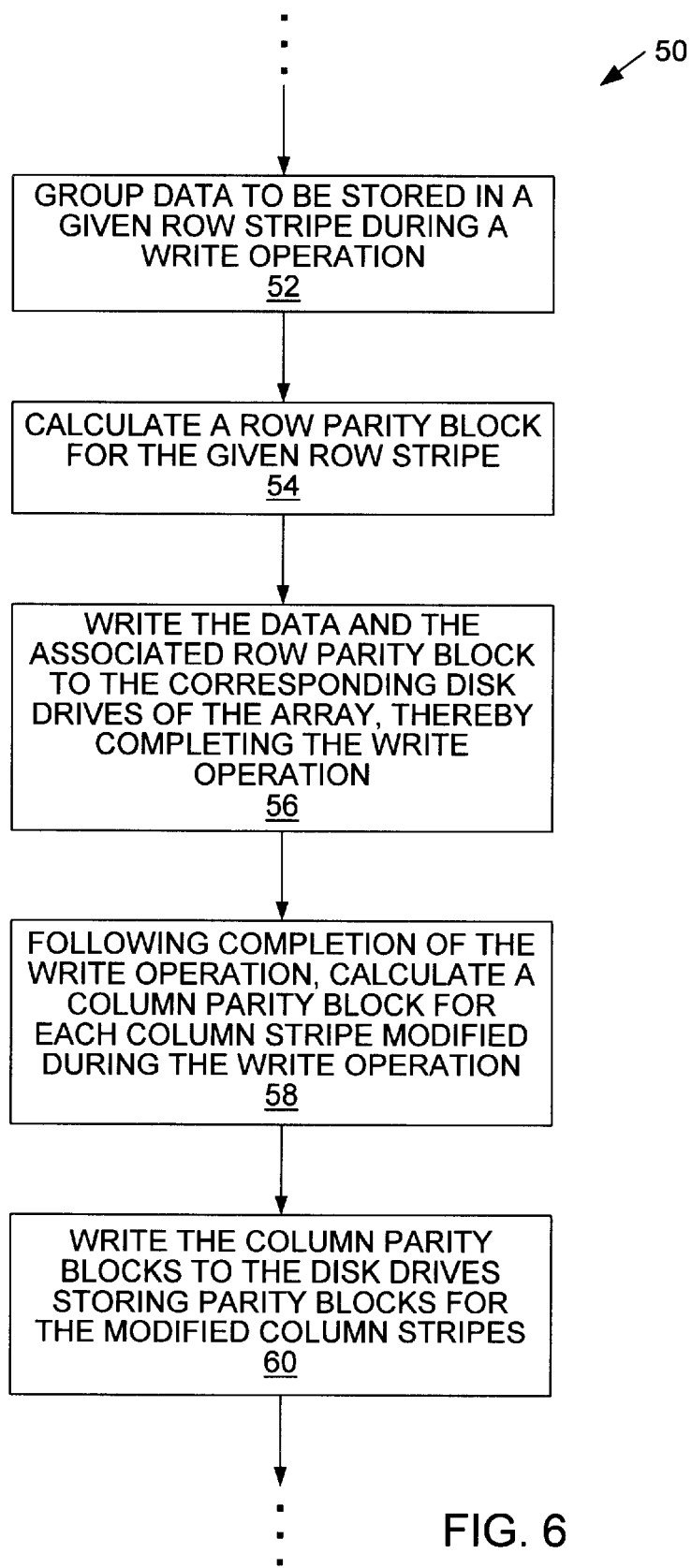
FIG. 6 is a flow chart of one embodiment of a method for storing data within the disk drives of the data storage system of FIG. 4, wherein the disk drives are operated in a row-dominant or "lazy column" parity update mode.

FIG. 6 is a flow chart of one embodiment of a method 50 for storing data within disk drives 32 of data storage system 24 of FIG. 4, wherein disk drives 32 are operated in the row-dominant or "lazy column" parity update mode. When the method is embodied within disk array controller 30, disk array controller 30 groups data to be stored in a given row stripe during a step 52. During a step 54, disk array controller 30 calculates a row parity block the given row data stripe. Disk array controller 30 may calculate the row parity block as an exclusive-OR of the data blocks within the given row stripe, and may have to read unmodified data blocks in the given row stripe in order to calculate,the row parity block. For example, if the given row stripe includes five data blocks and a write operation modifies only three of the five data blocks, disk array controller 30 may need to read the two unmodified data blocks in the given row stripe in order to calculate the row parity block. Disk array controller 30 writes the data and the associated row parity block to the corresponding disk drives of the array during a step 56, thereby completing the write operation. During a step 58, following completion of the write operation (e.g., periodically or during idle periods), disk array controller 30 calculates a column parity block for each column stripe modified during the write operation. Disk array controller 30 may calculate each column parity block as an exclusive-OR of the data blocks within the same column stripe, and may have to read unmodified data blocks in modified column stripes in order to calculate the column parity blocks. Disk array controller 30 writes the column parity blocks to the disk drives storing parity blocks for the modified column stripes during a step 60.

Figure 7:
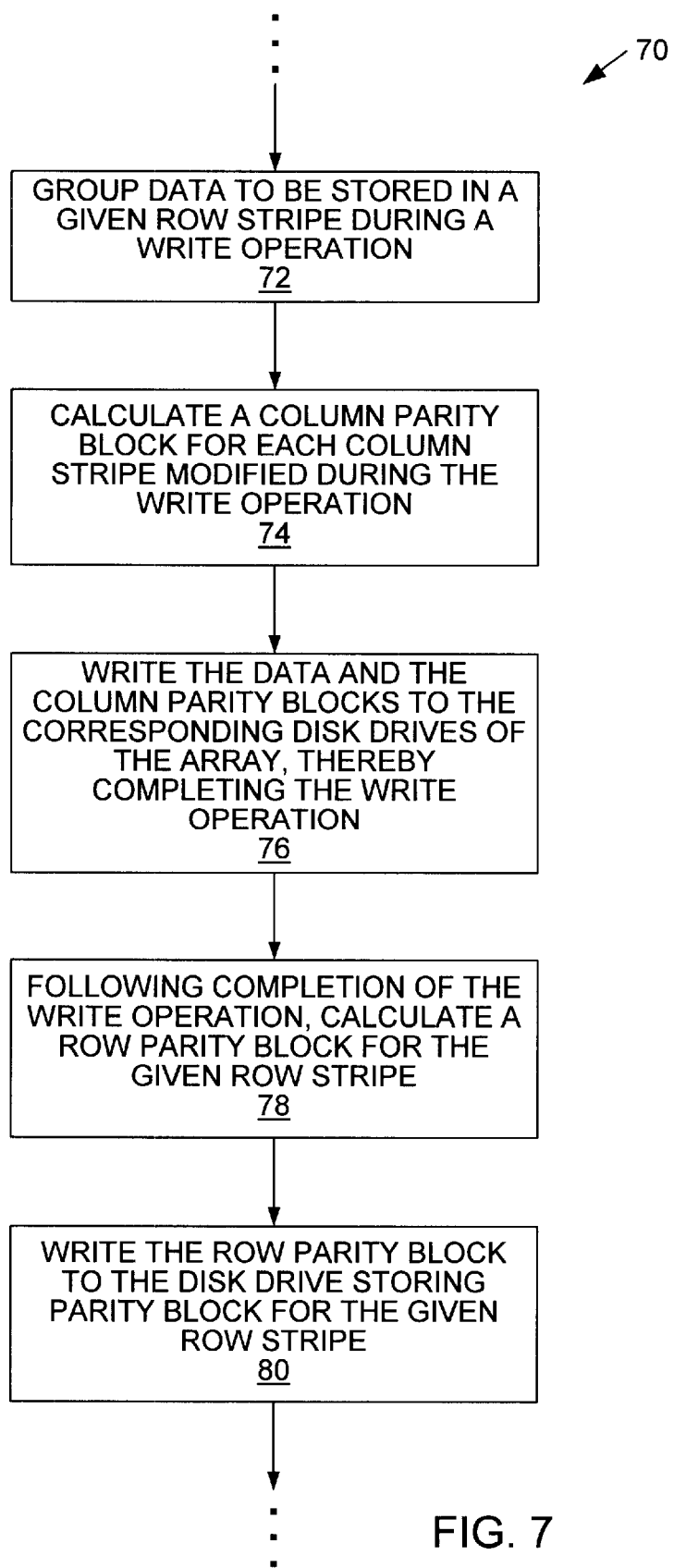
FIG. 7 is a flow chart of an alternate method for storing data within the disk drives of the data storage system of FIG. 4, wherein the disk drives are operated in a column-dominant or "lazy row" parity update mode.

FIG. 7 is a flow chart of one embodiment of an alternate method 70 for storing data within disk drives 32 of data storage system 24 of FIG. 4, wherein disk drives 32 are operated in the column-dominant or "lazy row" parity update mode. When the method is embodied within disk array controller 30, disk array controller 30 groups data to be stored in a given row stripe during a write operation during a step 72. During a step 74, disk array controller 30 calculates a column parity block for each column stripe modified during the write operation. Disk array controller 30 may calculate each column parity block as an exclusive-OR of the data blocks within the same column stripe, and may have to read unmodified data blocks in modified column stripes in order to calculate the column parity blocks. Disk array controller 30 writes the data and the column parity blocks to the corresponding disk drives of the array during a step 76, thereby completing the write operation. During a step 78, following completion of the write operation (e.g., periodically or during idle periods), disk array controller 30 calculates a row parity block for the given row stripe. Disk array controller 30 may calculate the row parity block as an exclusive-OR of the data blocks within the given row stripe, and may have to read unmodified data blocks in the given row stripe in order to calculate the row parity block. Disk array controller 30 writes the row parity block to the disk drive storing the parity block for the given row stripe during a step 80.

Figure 8:
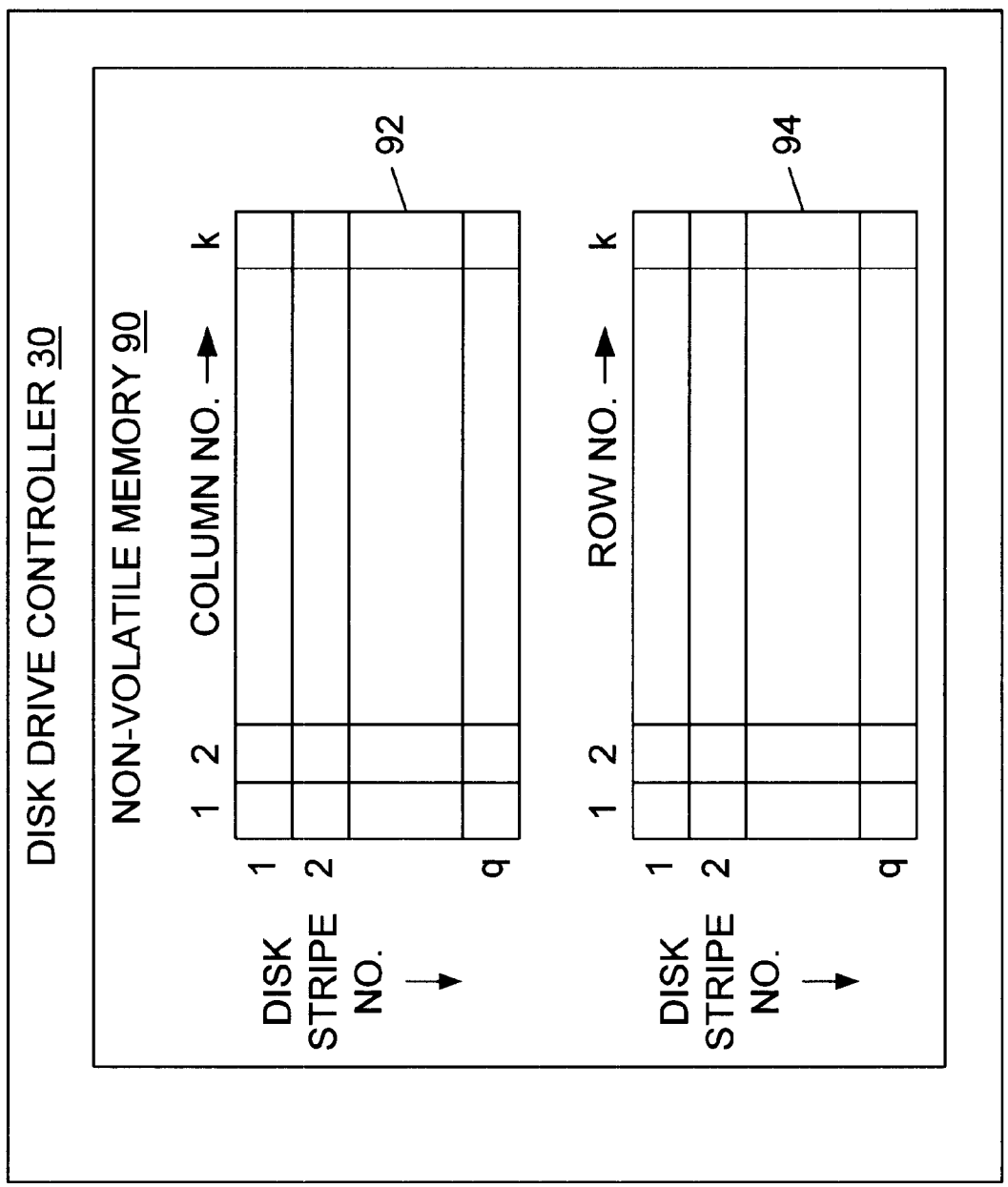
FIG. 8 is a diagram of one embodiment of the disk drive controller of FIGS. 4 and 5 wherein the disk drive controller includes two tables stored within a non-volatile memory, and wherein one of the tables is associated with the row-dominant or "lazy column" parity update mode, and wherein the other table is associated with the column-dominant or "lazy row" parity update mode.

FIG. 8 is a diagram of one embodiment of disk drive controller 30 of FIGS. 4 and 5 wherein disk drive controller 30 includes two tables 92 and 94 stored within a non-volatile memory 90. Table 92 is associated with the row-dominant or "lazy column" parity update mode, and includes multiple bit positions each corresponding to a different column stripe. When disk drives 32 are operating in the row-dominant or "lazy column" parity update mode and a data block in a given column stripe is modified, disk drive controller 30 sets (or clears) the corresponding bit position in table 92 indicating a need to recalculate the corresponding column parity block. Table 92 has q rows, one for each of the q stripes in each disk drive, and k columns. In the embodiment of FIG. 4, the disk drive array has dedicated parity drives at one end of each row in the array, forming a column of parity disk drives. In this case, the column of dedicated parity disk drives may be eliminated from table 92, and k may thus be equal to n. In other embodiments of data storage system 24, row parity information may be dispersed among the disk drives of the rows, and k may be equal to n+1.

Table 94 is associated with the column-dominant or "lazy row" parity update mode, and includes multiple bit positions each corresponding to a different row stripe. When disk drives 32 are operated in the column-dominant or "lazy row" parity update mode and a data block in a given row stripe is modified, disk drive controller 30 sets (or clears) the corresponding bit position in table 94 indicating a need to recalculate the corresponding row parity block. Table 94 has q rows, one for each stripe in each disk drive, and k columns. In the embodiment of FIG. 4, the disk drive array has dedicated parity drives at one end of each column in the array, forming a row of parity disk drives. In this case, the row of dedicated parity disk drives may be eliminated from table 94, and k may thus be equal to m. In other embodiments of data storage system 24, column parity information may be dispersed among the disk drives of the columns, k may be equal to m+1.

When operating in the row-dominant or "lazy column" parity update mode, disk array controller 30 may access table 92 (e.g., periodically or during system idle times) and update column parity blocks as indicated by the set (or cleared) bit positions within table 92. Similarly, when operating in the column-dominant or "lazy row" parity update mode, disk array controller 30 may access table 94 (e.g., periodically or during system idle times) and update row parity blocks as indicated by the set (or cleared) bit positions within table 94.

It is noted that in other embodiments, disk drive array controller 30 may include a single table stored within a non-volatile memory 90. When disk array controller 30 is operating in the row-dominant or "lazy column" parity update mode, the table may be operated as table 92 described above. When disk array controller 30 is operating in the column-dominant or "lazy row" parity update mode, the table may be operated as table 94 described above. Disk array controller 30 may need to update parity blocks as indicated by bit positions within the table during transitions between the row-dominant or "lazy column" parity update mode and the column-dominant or "lazy row" parity update mode.

Having current parity information for stripes in both rows and columns of the array allows data availability to be maintained despite multiple disk failures in the array. For example, a disk drive failure is said to be "row independent" if there are no other disk drive failures in the same row, and "column independent" if there are no other disk drive failures in the same column. A disk drive failure that is not row or column independent may become row or column independent when other failures are recovered. Such failures are termed "subsequently row/column independent." The failure is "row recoverable" if the lost data can be reconstructed from row parity information, and "column recoverable" if reconstruction can be accomplished using column parity information. A disk drive failure that is not row or column recoverable may become row or column recoverable when other failures are recovered. Such failures are termed "subsequently row/column recoverable." In general, data is lost when disk array controller 30 is operating in the row-dominant or "lazy column" parity update mode only if both of the following two conditions are true:

1. The data is neither row independent, nor subsequently row independent.

2. The data is (a) neither column independent, nor subsequently column independent, or (b) the data is column independent or subsequently column independent, but the column parity associated with the data is not current.

Regarding condition 1, it is noted that row independent data can always be recovered because the row parity is always kept up to date in the row-dominant or "lazy column" parity update mode.

Regarding condition 2, column independent data can be recovered when the system is operating in the row-dominant or "lazy column" parity update mode and the column parity associated with the failed data has been updated before the failure, and no other data in that column has changed since the column parity update.

It is noted that performing "lazy" parity updates create a "window of vulnerability." By selecting an appropriate lazy update frequency, a user may trade off the size of this window of vulnerability against performance. Calculating both row and column parity information for data blocks during each write operation is prohibitively time consuming, resulting in a severe reduction in system performance. However, the above two-stage parity update scheme, wherein the row/column parity values are updated during write operations and the column/row parity values are updated only periodically or during system idle periods, provides a significant increase in data availability with minimal (if any) negative impact on system performance.

Failure of a single disk drive in each row/column of the array is row/column recoverable using well known RAID techniques. If multiple disk drive failures occur in a single row or column, disk array controller 30 may enter a rebuild mode and attempt to recover data onto one or more spare disk drives.

Figure 9:
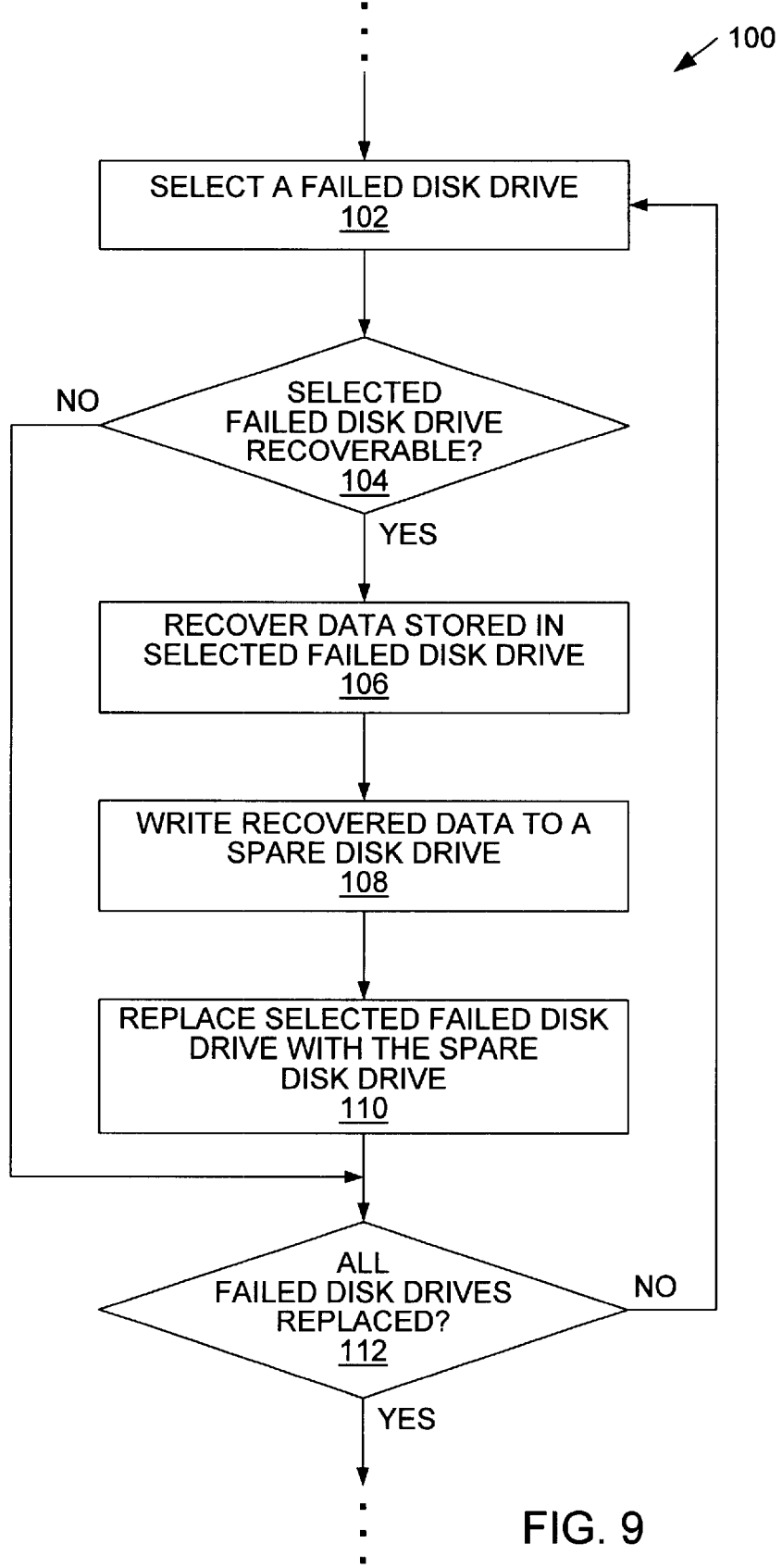
FIG. 9 is a flow chart of one embodiment of a method for repairing the disk drive array of the data storage system of FIG. 4 following failure of one or more of the disk drives.

FIG. 9 is a flow chart of one embodiment of a method 100 for repairing the disk drive array of data storage system 24 (FIG. 4) following failure of one or more of the disk drives 32. Method 100 may be embodied within disk array controller 30. During a step 102, a failed disk drive is selected. A determination is made regarding whether data stored in the selected failed disk drive is recoverable during a decision step 104. The determination centers around whether or not the data stored in the selected failed disk drive is recoverable using either: (i) data stored in other disk drives in the row in which the selected failed disk drive resides, or (ii) data stored in other disk drives in the column in which the selected failed disk drive resides.

Contemplated embodiments of data storage system 24 include at least one disk drive in each row of the disk drive array storing row parity data, and at least one disk drive in each column of the disk drive array storing column parity data. Where the selected failed disk drive resides in a given row of the disk drive array, the data stored in the selected failed disk drive may be recoverable using data stored in other disk drives in the given row unless: (i) any of the other disk drives in the given row is not operational, or (ii) row parity data stored in any of the other disk drives in the given row is not current. Where the selected failed disk drive also resides in a given column of the disk drive array, the data stored in the selected failed disk drive may be recoverable using data stored in other disk drives in the given column unless: (i) any of the other disk drives in the given column are operational, or (ii) column parity data stored in any of the other disk drives in the given column is not current.

If the data stored in the selected failed disk drive is determined to be recoverable during step 104, steps 106, 108, and 110 follow step 104. If the data stored in the selected failed disk drive is determined to be unrecoverable during step 104, a step 112 follows step 104.

During step 106, the data stored in the selected failed disk drive is recovered (e.g., using data stored in other disk drives in the same row/column). The recovered data is written to a spare disk drive during step 108. During step 110, the selected failed disk drive is replaced in the disk drive array with the spare disk drive.

Step 112 is a decision step. If all failed disk drives have been not replaced by spare disk drives during step 112, steps of method 100 are repeated as indicted in FIG. 9. If one or more failed disk drives remain unrecoverable after repeated applications of method 100, disk array controller 30 may indicate a catastrophic failure of data storage system 24, and may shut down data storage system 24.

Alternately, where one or more failed disk drives are otherwise recoverable except for an unavailability of spare disk drives, data storage system 24 may continue to operate, albeit with an expected reduction in performance and increased risk of data lossage if additional disks should fail.

It is noted that multiple recoverable disk drive failures may prompt disk array controller 30 to switch from the row-dominant or "lazy column" parity update mode to the column-dominant or "lazy row" parity update mode, or vice versa. For example, if disk array controller 30 is operating in the row-dominant or "lazy column" parity update mode and a row parity drive fails, disk array controller 30 may switch from the row-dominant or "lazy column" parity update mode to the column-dominant or "lazy row" parity update mode such that the amount of valid and current parity information is maximized. Also, if disk array controller 30 is operating in the row-dominant or "lazy column" parity update mode and two or more disk drives fail in the same row, disk array controller 30 may switch from the row-dominant or "lazy column" parity update mode to the column-dominant or "lazy row" parity update mode such that the amount of valid and current parity information is maximized.

Similarly, if disk array controller 30 is operating in the column-dominant or "lazy row" parity update mode and a column parity disk drives fails, disk array controller 30 may switch from the column-dominant or "lazy row" parity update mode to the row-dominant or "lazy column" parity update mode such that the amount of valid and current parity information is maximized. Alternately, if disk array controller 30 is operating in the column-dominant or "lazy row" parity update mode and two or more disk drives fail in the same column, disk array controller 30 may switch from the column-dominant or "lazy row" parity update mode to the row-dominant or "lazy column" parity update mode such that the amount of valid and current parity information is maximized.

It is noted that from a performance point of view, the row-dominant or "lazy column" parity update mode is preferable when data is written to disk drives 32 in row-major fashion (i.e., row by row), and the column-dominant or "lazy row" parity update mode is preferable when data is written to disk drives 32 in column-major fashion (i.e., column by column).

Numerous variations and modifications will become apparent to those skilled in the art once the above disclosure is fully appreciated. It is intended that the following claims be interpreted to embrace all such variations and modifications.

What is claimed is:

1. A storage system, comprising:
    a two dimensional array of disk drives comprising a plurality of logical rows of drives and a plurality of logical columns of drives;
    at least one drive array controller configured to store data in stripes across said plurality of logical rows;
    wherein said at least one drive array controller is configured to calculate and store row error correction data for each stripe of data across each one of said plurality of logical rows on one of said drives for each row;
    wherein said at least one drive array controller is configured to calculate and store column error correction data for column data striped across each one of said plurality of logical columns on one of said drives for each column;
    wherein said at least one drive array controller is configured to calculate and store said row error correction data for a particular row data stripe in response to a write transaction to said particular row data stripe before completing said write transaction; and
    wherein said at least one drive array controller is configured to delay calculating and storing said column error correction data for each column data stripe modified by said write transaction until after completion of said write transaction.

2. The system as recited in claim 1, wherein said at least one drive array controller is configured to update said column error correction data during idle times.

3. The system as recited in claim 2, wherein said at least one drive array controller is configured to update said column error correction data during idle times only for each column data stripe modified since said column error correction data was last updated.

4. The system as recited in claim 3, wherein said at least one drive array controller is configured to maintain a table of column data stripes modified by a write transaction since said column error correction data was last updated.

5. The system as recited in claim 1, wherein said at least one drive array controller is configured to update said column error correction data periodically.

6. The system as recited in claim 5, wherein said at least one drive array controller is configured to update said column error correction data periodically only for each column data stripe modified since said column error correction data was last updated.

7. The system as recited in claim 6, wherein said at least one drive array controller is configured to maintain a table of column data stripes modified by write transaction since said column error correction data was last updated.

8. The system as recited in claim 1, wherein said row error correction data comprises parity data for each row data stripe, and wherein said column error correction data comprises parity data for each column data stripe.

9. The system as recited in claim 1, wherein said at least one drive array controller is configured to recover a failed one of said two dimensional array of disk drives from said row error correction data for the one of said logical rows of drives including the failed drive if only one drive is failed in that logical row, and if more than one drive has failed in that logical row, from said column error correction data for the one of said logical column of drives including the failed drive if only one drive is failed in that logical column and no column stripes have been modified for that logical column since the last update of said column error correction for that column.

10. A data storage system, comprising:
    a plurality of disk drives logically arranged to form a two-dimensional disk drive array having a m+1 rows and n+1 columns where $m \geq 2$ and $n \geq 2$, and wherein each disk drive comprises q data storage regions where $q \geq 1$, and wherein each row of the disk drive array comprises q row stripes, and wherein each row stripe includes a different one of the q data storage regions of each of the n+1 disk drives in the same row, and wherein each column of the disk drive array comprises q column stripes, and wherein each column stripe includes a different one of the q data storage regions of each of the m+1 disk drives in the same column;
    a disk array controller coupled to each of the plurality of disk drives and configured to group data to be stored in a given row stripe during a write operation, to calculate a row parity block for the given row stripe, and to calculate a column parity block for each column stripe modified during the write operation; and
    wherein the disk array controller is configured to either:
        (i) calculate the row parity block for the given row stripe before completing the write operation, and delay the column parity block calculations until after the completion of the write operation, or (ii) calculate the column parity blocks before completing the write operation, and delay the row parity block calculation until after the completion of the write operation.

11. The data storage system as recited in claim 10, wherein m+1 rows include a first m rows and a last row, and wherein the n+1 columns include a first n columns and a last column, and wherein the first m rows and the first n columns include data disk drives for storing data, and wherein the last row includes n parity disk drives for storing column parity information, and wherein the last column includes m parity disk drives for storing row parity information.

12. The data storage system as recited in claim 11, wherein a disk drive location in the last row and the last column is empty.

13. The data storage system as recited in claim 10, wherein n of the data storage regions of each row stripe are used to store data blocks, and wherein the remaining data storage region of each row stripe is used to store a row parity block, and wherein the row parity block is dependent upon the n data blocks of the row stripe.

14. The data storage system as recited in claim 13, wherein the disk array controller is configured to calculate the row parity block for a given row stripe as an exclusive-OR of the contents of n data blocks of the row stripe.

15. The data storage system as recited in claim 10, wherein m of the data storage regions of each column stripe are used to store data blocks, and wherein the remaining data storage region of each column stripe is used to store a column parity block, and wherein the column parity block is dependent upon the m data blocks of the column stripe.

16. The data storage system as recited in claim 15, wherein the disk array controller is configured to calculate the column parity block for a given column stripe as an exclusive-OR of the contents of m data blocks of the column stripe.

17. The data storage system as recited in claim 10, further comprising a memory for storing information used to track the parity block calculations delayed by the disk array controller.

18. A method for storing data within a plurality of disk drives logically arranged to form a two-dimensional disk drive array having a plurality of rows and columns, wherein each disk drive comprises at least one data storage region, and wherein each row of the disk drive array comprises at least one row stripe including a different one of the data storage regions of each of the disk drives in the same row, and wherein each column of the disk drive array comprises at least one column stripe including a different one of the data storage regions of each of the disk drives in the same column, the method comprising:

grouping data to be stored in a given row stripe during a write operation;

calculating a row parity block for the given row stripe;

writing the data and the associated row parity block to the corresponding disk drives of the array, thereby completing the write operation;

calculating a column parity block for each column stripe modified during the write operation, wherein the calculating is performed after the completion of the write operation; and writing the column parity blocks to the disk drives storing the parity blocks for the modified column stripes.

19. A method for storing data within a plurality of disk drives logically arranged to form a two-dimensional disk drive array having a plurality of rows and columns, and wherein each disk drive comprises at least one data storage region, and wherein each row of the disk drive array comprises at least one row stripe including a different one of the data storage regions of the disk drives in the same row, and wherein each column of the disk drive array comprises at least one column stripe including a different one of the data storage regions of the disk drives in the same column, the method comprising:

grouping data to be stored in a given row stripe during a write operation;

calculating a column parity block for each column stripe modified during the write operation;

writing the data and the column parity blocks to the corresponding disk drives of the array, thereby completing the write operation;

calculating a row parity block for the given row stripe, wherein the calculating is performed after the completion of the write operation; and writing the row parity block to the disk drive storing the parity block for the given row stripe.

20. A method for repairing a disk drive array following failure of at least one of the disk drives, wherein the disk drive array comprises a plurality of disk drives logically arranged in multiple rows and multiple columns, wherein at least one disk drive in each row of the disk drive array stores row parity data, and wherein at least one disk drive in each column of the disk drive array stores column parity data, the method comprising:

selecting a failed disk drive;

determining if data stored in the selected failed disk drive is recoverable using either: (i) data stored in other disk drives in the row in which the selected failed disk drive resides, or (ii) data stored in other disk drives in the column in which the selected failed disk drive resides;

performing the following steps if the data stored in the selected failed disk drive is recoverable:
recovering the data stored in the selected failed disk drive;
writing the recovered data to a spare disk drive;
replacing the selected failed disk drive in the disk drive array with the spare disk drive;

repeating the above steps until all failed disk drives have been replaced by spare disk drives;

wherein if the selected failed disk drive resides in a given row of the disk drive array, the data stored in the selected failed disk drive is not recoverable using data stored in other disk drives in the given row if: (i) any of the other disk drives in the given row is not operational, or (ii) row parity data stored in any of the other disk drives in the given row is not current; and wherein if the selected failed disk drive resides in a given column of the disk drive array, and the data stored in the selected failed disk drive is not recoverable using data stored in other disk drives in the given column if: (i) any of the other disk drives in the given column is not operational, or (ii) column parity data stored in any of the other disk drives in the given column is not current.

* * * * *